L. W. ROCKWELL.
METHOD OF MAKING ANTIFRICTION ELEMENTS.
APPLICATION FILED APR. 8, 1920.

1,431,183.  Patented Oct. 10, 1922.

INVENTOR
Lea W. Rockwell.
BY
Edward C. Sasnett.
ATTORNEY

Patented Oct. 10, 1922.

1,431,183

UNITED STATES PATENT OFFICE.

LEA W. ROCKWELL, OF NEW HAVEN, CONNECTICUT, ASSIGNOR, BY MESNE ASSIGNMENTS, TO STANDARD STEEL AND BEARINGS INCORPORATED, OF WILMINGTON, DELAWARE, A CORPORATION OF DELAWARE.

METHOD OF MAKING ANTIFRICTION ELEMENTS.

Application filed April 8, 1920. Serial No. 372,259.

*To all whom it may concern:*

Be it known that I, LEA W. ROCKWELL, a citizen of the United States, and a resident of New Haven, in the county of New Haven and State of Connecticut, have invented certain new and useful Improvements in Methods of Making Antifriction Elements, of which the following is a specification.

This invention relates to steel balls for use in antifriction bearings, and to a method of manufacture of such balls.

An object of this invention is a method of manufacture of steel balls for antifriction bearings, the practice of which produces balls in which the internal stresses are uniformly distributed throughout the body of the ball and in which the grain of the metal is along continuous, substantially convex lines.

An additional object of the invention is the provision of a steel ball for antifriction bearings which is of unform strength throughout and which is free from folds or seams in the metal of which it is formed.

A common method of manufacturing steel balls for use in antifriction bearings is to head a cylindrical slug of steel into an approximately spherical blank, the corners of the slug being forced into the spherical surface of the blank and the excess metal of the slug being caused to form an equatorial ridge or band on the blank. The shaped blank is then hardened, after which it is ground and lapped to produce the finished ball. The flow of the metal in the formation of the shaped blank is such that there are concave bends in the grain of, or folds in the metal near the lines of entrance of the corners of the cylindrical slug into the shaped blank which result in circular seams near the poles of the shaped blanks. In addition the flow of the metal to form the equatorial ridge results in a sharp reverse bend in the grain near the ridge. The lines of the grain of the metal are therefore irregular and the internal stresses of the ball are not uniform. The seams and the reverse bend form weak points at which the ball is apt to give way.

I have discovered, however, that balls may be made from cylindrical blanks without the formation of the above-mentioned folds and the metal caused to flow, during the heading operation, in such a way that the grain of the metal is along continuous convex lines, the internal stresses are uniform and the whole ball is of uniform strength. In forming the spherical blank from the cylindrical blank, the ends of the cylindrical blank are not pressed into the spherical blank but are left projecting at the poles of the spherical blank, the excess metal remaining in the projecting ends instead of being forced into an equatorial ridge.

The various steps in the process are disclosed in the accompanying drawings in which Fig. 1 is a blank or slug;

Figure 1:
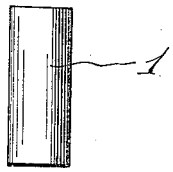
Figure 2:
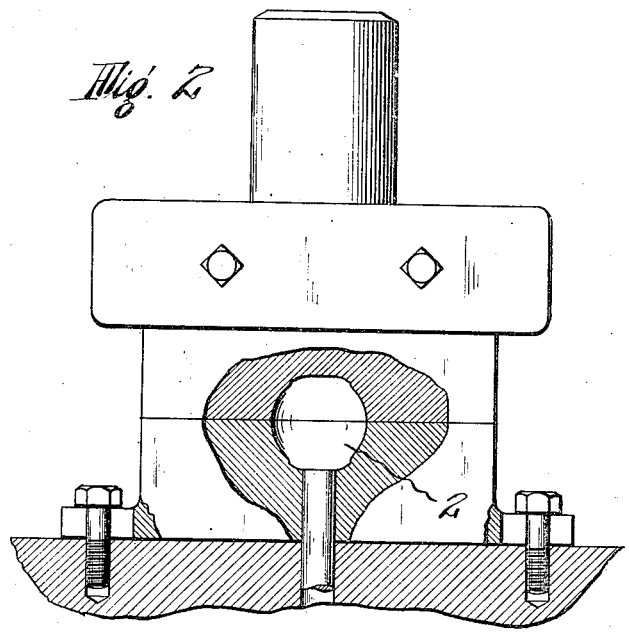
Fig. 2 illustrates the first step in the process.
Figure 3:
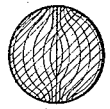
Fig. 3 is a sectional view of a finished ball, the grain of the metal being shown.

In the practice of my process, a cylindrical slug 1 (Fig. 1) of proper mass is forged or headed by means of a power or drop press equipped with suitable dies into the form shown in Fig. 2. The opposite ends of the cylindrical slug are not forced into the body of the spherically-shaped blank 2 but are left protruding therefrom. The pressure applied at the opposite ends of the blank has caused the middle portion thereof to bulge out to fill up the dies. The metal of the midportion of the slug has been caused to flow approximately radially, resulting in a grain along continuous convex lines, as shown in Fig. 3. The internal stresses of the ball are uniform and the entire ball is of uniform strength throughout. After the slug has been given its approximate spherical shape, it is ground in the usual way to a true sphere of the desired size.

Thus it is seen that I have provided a simple and efficient process for making steel balls for antifriction bearings which produces balls of uniform grain and great strength and in which the internal stresses are uniform.

What I claim is:

1. The step in the process of making steel balls which consists in forcing a cylindrical slug into a body of general spherical shape, with the cylindrical ends of the slug left extending from the body.

2. The step in the process of making steel balls which consists in forcing a cylindrical slug having flat ends into an approximately spherical body having projecting from the poles thereof the cylindrical ends of the slug.

3. The method of making steel balls which consists in applying pressure to the opposite ends of a cylindrical slug to force out the intermediate portion of the slug into approximately spherical form with the ends of the slug projecting therefrom and in grinding the slug to remove the projecting portions.

LEA W. ROCKWELL.